United States Patent
Liu et al.

(10) Patent No.: US 11,947,993 B2
(45) Date of Patent: Apr. 2, 2024

(54) COOPERATIVE INPUT/OUTPUT OF ADDRESS MODES FOR INTEROPERATING PROGRAMS

(71) Applicant: International Business Machines Corporation, Armonk, NY (US)

(72) Inventors: Ming Ran Liu, Beijing (CN); Jing Lu, Beijing (CN); Naijie Li, Haidian District (CN); Xiao Yan Tang, Beijing (CN); Yuan Zhai, Beijing (CN); Kershaw S. Mehta, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 443 days.

(21) Appl. No.: 17/353,945

(22) Filed: Jun. 22, 2021

(65) Prior Publication Data

US 2022/0405118 A1    Dec. 22, 2022

(51) Int. Cl.
| | |
|---|---|
| *G06F 3/00* | (2006.01) |
| *G06F 9/34* | (2018.01) |
| *G06F 9/455* | (2018.01) |
| *G06F 9/46* | (2006.01) |
| *G06F 9/54* | (2006.01) |

(52) U.S. Cl.
CPC ............... *G06F 9/463* (2013.01); *G06F 9/34* (2013.01); *G06F 9/45508* (2013.01); *G06F 9/544* (2013.01); *G06F 9/546* (2013.01)

(58) Field of Classification Search
CPC ....................................................... G06F 9/455
See application file for complete search history.

(56) References Cited

U.S. PATENT DOCUMENTS

| | | | |
|---|---|---|---|
| 4,970,639 A | 11/1990 | Diefendorf et al. | |
| 5,150,474 A * | 9/1992 | Kaneko | G06F 9/4484 |
| | | | 712/E9.082 |

(Continued)

FOREIGN PATENT DOCUMENTS

JP    2008305279 A    12/2008

OTHER PUBLICATIONS

Anupama Chandrasekhar, IGC: The Open Source Intel Graphics Compiler. (Year: 2019).*

(Continued)

*Primary Examiner* — Lechi Truong
(74) *Attorney, Agent, or Firm* — Cantor Colburn LLP (57) ABSTRACT

A computer-implemented method includes creating a first file control block in a primary runtime environment with a first addressing mode and a second file control block in a secondary runtime environment with a second addressing mode, where both the first file control block and the second file control block describe a status of a first file of a caller program in the primary runtime environment. The parameters of the first file of the caller program in the primary runtime environment are passed to a target callee program in the secondary runtime environment. An anchor is added in the first file control block as a link to the second file control block. The first file control block are the second file control block synchronized with updates to the first file in the primary runtime environment and the passed parameters of the first file in the secondary runtime environment.

17 Claims, 6 Drawing Sheets

(56) References Cited

U.S. PATENT DOCUMENTS

| | | | |
|---|---|---|---|
| 5,452,456 A | 9/1995 | Mourey et al. | |
| 5,490,256 A | 2/1996 | Mooney et al. | |
| 5,581,769 A | 12/1996 | Wallace et al. | |
| 5,724,585 A | 3/1998 | Hassitt et al. | |
| 5,764,947 A | 6/1998 | Murphy et al. | |
| 5,784,638 A | 7/1998 | Goetz et al. | |
| 5,987,495 A | 11/1999 | Ault et al. | |
| 6,021,265 A | 2/2000 | Nevill | |
| 6,199,202 B1 | 3/2001 | Coutant et al. | |
| 6,226,761 B1 * | 5/2001 | Berstis | G06F 12/0253 714/38.11 |
| 6,502,237 B1 | 12/2002 | Yates et al. | |
| 6,725,366 B1 | 4/2004 | Swanberg | |
| 7,171,543 B1 | 1/2007 | Ronen et al. | |
| 7,406,681 B1 | 7/2008 | Hinker | |
| 7,451,298 B2 | 11/2008 | Peak et al. | |
| 8,813,104 B2 | 8/2014 | Saborowski | |
| 9,569,234 B2 | 2/2017 | De et al. | |
| 9,652,210 B2 | 5/2017 | Suchy et al. | |
| 2004/0268319 A1 | 12/2004 | Tousignant | |
| 2005/0086650 A1 | 4/2005 | Yates et al. | |
| 2006/0184919 A1 | 8/2006 | Chen et al. | |
| 2006/0184920 A1 | 8/2006 | Wang et al. | |
| 2008/0034194 A1 | 2/2008 | Peak et al. | |
| 2009/0089764 A1 | 4/2009 | Lai et al. | |
| 2012/0233612 A1 | 9/2012 | Beckett | |
| 2012/0304160 A1 | 11/2012 | Soeder | |
| 2012/0323935 A1 * | 12/2012 | Evans | G06F 16/178 707/752 |
| 2013/0073836 A1 * | 3/2013 | Gschwind | G06F 9/3016 712/E9.016 |
| 2014/0365754 A1 | 12/2014 | Combs et al. | |
| 2015/0277867 A1 | 10/2015 | Hasabnis et al. | |
| 2016/0011869 A1 | 1/2016 | Jackson | |
| 2017/0039367 A1 | 2/2017 | Ionescu et al. | |
| 2017/0329621 A1 | 11/2017 | Beckett | |
| 2018/0165338 A1 | 6/2018 | Kumar et al. | |
| 2018/0232394 A1 * | 8/2018 | Danziger | G06F 16/1873 |
| 2018/0276016 A1 | 9/2018 | Duminy et al. | |
| 2020/0192730 A1 * | 6/2020 | Li | G06F 9/547 |
| 2020/0250790 A1 * | 8/2020 | Wan | G09G 5/363 |
| 2020/0326942 A1 | 10/2020 | Lu et al. | |
| 2022/0342732 A1 * | 10/2022 | Subramani Jayavelu | G06F 9/546 |

OTHER PUBLICATIONS

IBM select/selectex (BPX1SEL, BPX4SEL)—Select on file descriptors and message queues ibm.com/support/knowledgecenter/en/SSLTBW_2.3.0/com.ibm.zos.v2r3.bpxb100/sel.htm (Retrieved Aug. 20, 2020), 12 pages.

List of IBM Patents or Patent Applications Treated as Related; (Appendix P), Filed Jun. 24, 2021; 2 pages.

Microsoft, "Process Interoperability;" https://docs.microsoft.com/en-us/windows/win32/winprog64/process-interoperability (retrieved Oct. 21, 2019), 1 page.

Microsoft; "32-bit and 64-bit Interoperability;" https://msdn.microsoft.com/en-us/library/windows/desktop/ee872017(v=vs.85).aspx; retrieved Jun. 23, 2018; pp. 1-2.

Tang et al., "Termination of Programs Associated With Different Addressing Modes", U.S. Appl. No. 16/885,716, filed May 28, 2020.

* cited by examiner

COOPERATIVE INPUT/OUTPUT OF ADDRESS MODES FOR INTEROPERATING PROGRAMS

BACKGROUND

The present invention generally relates to programmable computing systems, and more specifically, to programmable computing systems configured for cooperative input/output of addressing modes for interoperative programs.

Interoperability is the ability of disparate elements of a computing system to communicate and exchange information with one another. The efficient exchange of information between the computing system elements is necessary for the proper functioning of the system as a whole. In order for the exchange of information between the computing elements to be meaningful, there needs to be a common data structure protocol and formatting protocol between the computing elements. Additionally, the computing elements need to share a common meaning for the information that is being exchanged.

SUMMARY

Embodiments of the present invention are directed to a computer-implemented method for cooperative input/output of address modes for interoperating programs. A non-limiting example of the computer-implemented method includes creating a first file control block in a primary runtime environment with a first addressing mode and a second file control block in a second runtime environment with a second addressing mode, where both the first file control block and the second file control block describe a status of a first file of a caller program in the primary runtime environment. The parameters of the first file of the caller program in the primary runtime environment are passed to a target callee program in the secondary runtime environment. An anchor is added in the first file control block as a link to the second file control block. The first file control block and the second file control block are synchronized with updates to the first file in the primary runtime environment and the passed parameters of the first file in the secondary runtime environment.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide computer-implemented methods, computing systems, and computer program products directed towards an interoperability methodology for programs that operate using different addressing modes. The methodology permits a primary runtime environment operating with a first addressing mode to create a file control block describing a status of a file. A secondary runtime environment with a second addressing mode creates a second file control block that describes the status of the file and both runtime environments synchronize the file control blocks with each other. This permits the input/output operations related to the file to be visible and consistent across both runtime environments.

Addressing modes (AMODEs) are rules applied in an instruction set architecture (ISA) that refer to the manner in which the operand of an instruction is specified. Computing programs that implement instructions using one addressing mode need to coexist with other computing programs that implement instructions using different addressing modes. This interoperability of computing programs that utilize different addressing modes is critical for the modernization and scalability of computing systems. Issues arise when a computing program that utilizes one addressing mode attempts to exchange information with another computing program utilizing another addressing mode. These interoperability issues include differences in memory addressability, linkage convention issues as to how stack frames are managed and how parameters are passed.

One or more embodiments of the present invention address one or more of the above-described shortcomings by providing computer-implemented methods, computing systems, and computer program products that support cooperating input/output (I/O) for interoperating programs using different addressing modes, in which the runtime environments for each program cooperate, record, and update the I/O status to enable a transparent and consistent execution of the programs.

Referring to FIGS. 1-4, block diagrams illustrating an execution of a target callee program 204 in a secondary runtime environment 202 in response to a caller program 104 in a primary runtime environment 102, are shown in accordance with one or more embodiments of the present invention. As described below, the caller program 104 uses an addressing mode M (AMODE M) and runs on a primary runtime environment 102, and the target callee program 204 uses an addressing mode N (AMODE N) and runs on a secondary runtime environment 202. The primary runtime environment 102 can be a single-threaded runtime environment. The secondary runtime environment 202 can further be a pre-initialized runtime environment, which includes pre-initializing, maintaining, terminating a persistent language executing environment, to enhance interoperability and reduce overhead for communication between caller program 104 and the target callee program 204. As used herein, the M of AMODE M and the N of AMODE N represent integer numbers; in which M can be greater than N, or N can be greater than M. For example, M can be 64 bits and N can be 32 bits, or M can be 32 bits and N can be 64 bits. Together, the primary runtime environment 102 and the secondary runtime environment 202 are a paired runtime environment, in which the two environments are paired to run for each other. It should be appreciated that all or a portion of the functionality described by FIGS. 1-4 can be performed on a computer system (e.g., the computer system 600 described by FIG. 6).

Figure 1:
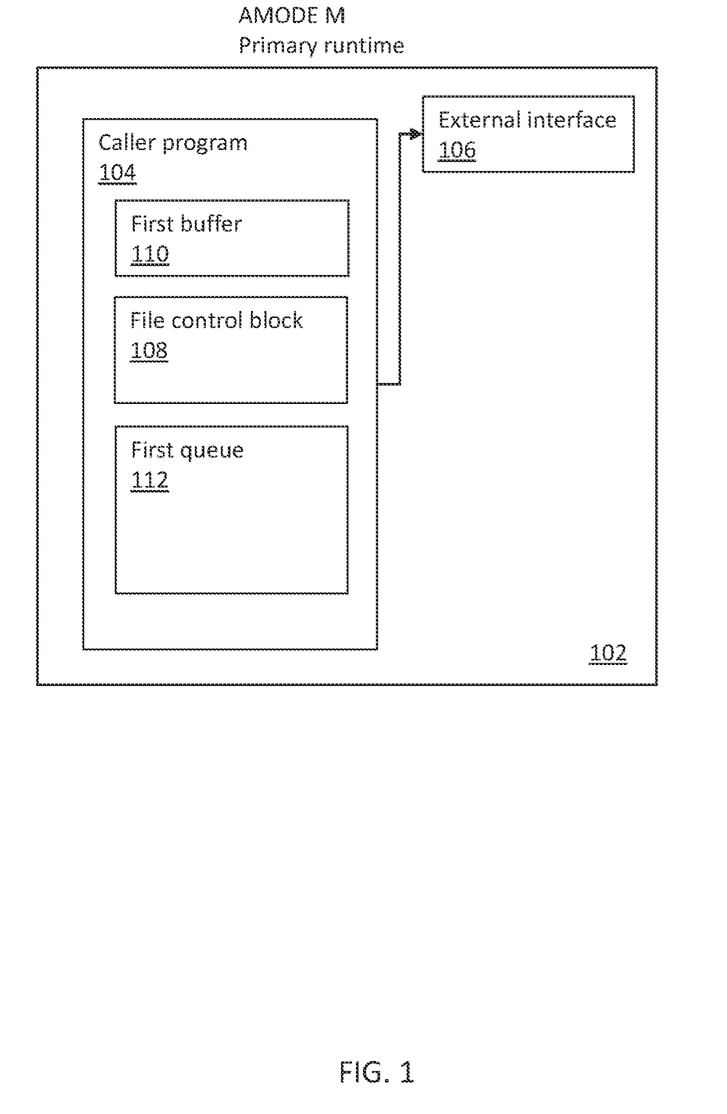
FIG. 1 illustrates a system for cooperative input/output of addressing modes for interoperative programs according to one or more embodiments of the present invention.
Figure 2:
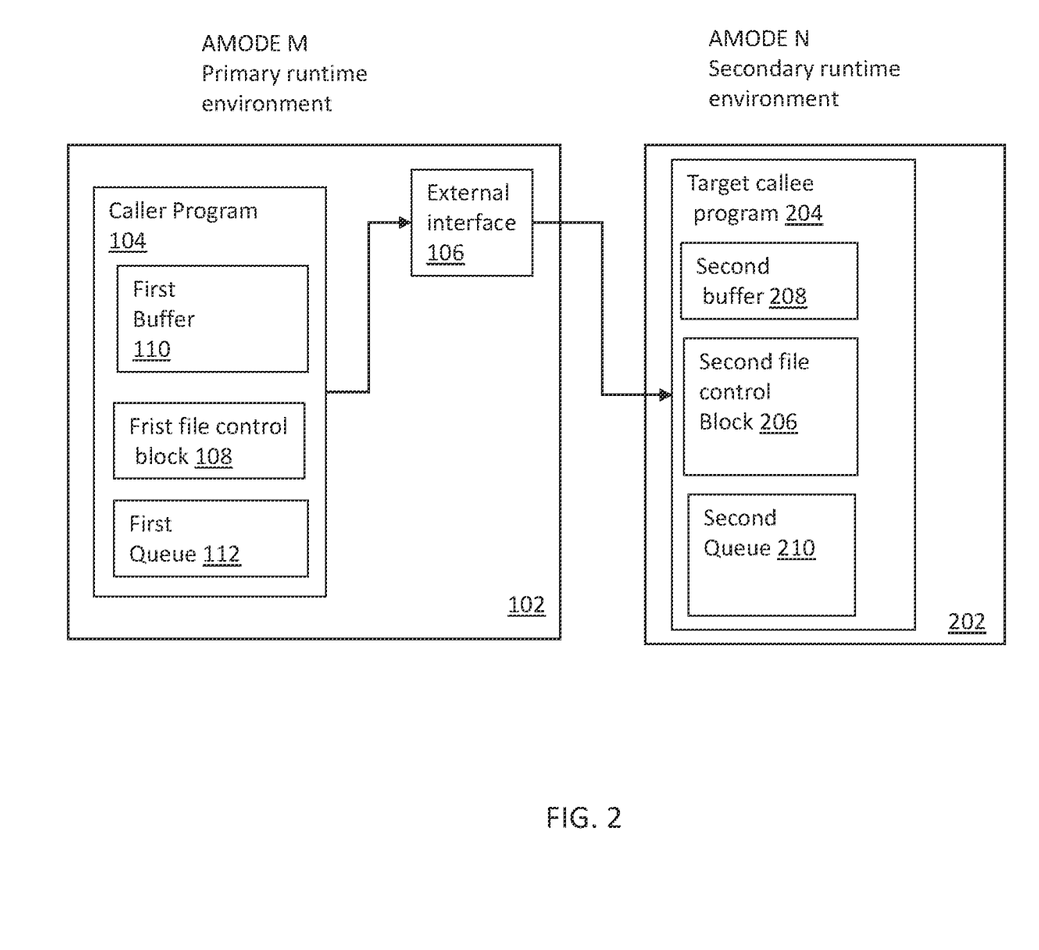
FIG. 2 illustrates a system for cooperative input/output of addressing modes for interoperative programs according to one or more embodiments of the present invention.

Referring to FIGS. 1 and 2, a caller program 104 operating within a primary runtime environment 102 (e.g., an AMODE M environment) opens a file (not shown) and uses an external interface 106, (e.g., runOnN( ) to call a target callee program 204. The caller program 104 includes computer executable code such as an application, a compiler, or a runtime library. The caller program 104 executes the call to the target callee program 204 by providing a name and parameters of the target callee program 204 to the external interface 106.

In response to opening the file, a runtime library creates a first file control block 108 within the primary runtime environment 102. As used herein a runtime library (not shown) is a set of software programs for implementing runtime functionality, and a processor or a set of processors that use the programs included in the runtime library. In some embodiments of the present invention, the runtime library includes a compiler (not shown) that uses the software programs included in the runtime library. The first file control block 108, also known as a file descriptor, is a data structure that maintains a status of the opened file, and includes, but is not limited to, a name, extension, location on a logical drive. A first buffer 110 stores a content load of the file, and the first file control block 108 includes a pointer to the address(es) of the content load. The pointer is a computer-coded object that references a location in memory. The first buffer 110 is a temporary memory of the caller program 104. The runtime library further creates an address field for another pointer in the first file control block 108 to store the address of a copy of the first file control block 108 that is stored in the secondary runtime environment 202. The pointer is an anchor from the first file control block 108 in the primary runtime environment 102 to a copy of the file control block in the secondary runtime environment 202. A record of the new first file control block 108 is written to a first queue 112 of the caller program 104. In some embodiments of the present invention, the first queue 112 can include multiple queues, including a new file queue, an updated queue, and a deleted file queue. In these embodiments, the record of the first file control block 108 can be included in the new file queue.

The runtime library determines whether the caller program 104 is based on a different addressing mode than the target callee program 204. The external interface 106 calls the target callee program 204, based on the information provided by the caller program 104. Based on reading the response from the target callee program 204, the runtime library can determine whether the caller program 104 and the target callee program 204 operate using different addressing modes. If both the caller program 104 and the target callee program 204 operate using the same addressing mode, the runtime library does not address an inoperability. If, however, the caller program 104 operates using a different addressing mode than the target callee program 204, then the runtime library addresses the interoperability between the programs through a secondary runtime environment 202. The secondary runtime environment 202 is either created, or a pre-existing secondary runtime environment 202 already exists for the target callee program 204. For example, a runtime library (not shown) executing the caller program 104 can determine whether this is a first instance of the external interface 106 calling the target callee program 204 or whether the external interface 106 has previously called the target callee program 204. If it is a first instance of the external interface 106 calling the target callee program, the runtime library can create a pre-initialized secondary runtime environment 202. If, however, this external interface 106 has previously called the target callee program 204, the runtime library can utilize a previously created secondary runtime environment 202. The secondary runtime environment 202 is a runtime environment that uses an addressing mode (e.g., AMODE N), which is different than the addressing mode (AMODE M) of the primary runtime environment 102, or in other words, M does not equal N. Upon receiving a response from the target callee program 204, the external interface 106 relinquishes control of the target callee program 204 to the caller program 104. The caller program 104 transmits the parameters of the file to the target callee program 204 via the external interface 106, such that the target callee program 204 has a copy of the file.

The runtime library creates a second file control block 206 by retrieving the entry of the data of the first file control block 108 from the new file queue of the first queue 112. The runtime library then stores the content load of the copy of the file in a second buffer 208 of the target callee program 204. The second buffer 208 is a temporary memory of the target callee program 204, and the second file control block 206 includes a pointer that points to the address(es) of the content load. As the second file control block 206 is a copy, it also includes an address field of another pointer to store the address of the first file control block 108. The runtime library compares the addressing mode of the primary runtime environment 102 (e.g., AMODE M) and the addressing mode of the secondary runtime environment 202 (AMODE N) to determine whether the number of bits of AMODE M is greater than the number of bits of AMODE M, or the of bits of AMODE N is greater than the number of bits of AMODE M. For example, is AMODE M means 32 bit addressing and AMODE N means 64 bit addressing, the number of bits of AMODE N is greater than the number of bits of AMODE M.

If the number of bits of addressing mode of the secondary runtime environment 202 (AMODE N) is greater than the number of bits of the addressing mode of the primary runtime environment 102 (AMODE M), the runtime library updates the second file control block 206 by writing the address of the first file control block 108 in the address field for a pointer of the second file control block 206. A description of the process if the number of bits of addressing mode of the secondary runtime environment 202 (AMODE N) is less than the number of bits of the addressing mode of the primary runtime environment 102 (AMODE M) is provided below. In response to the runtime library writing the address of the first file control block 108, the runtime library deletes the record of the first file control block 108 from the new file queue of the first queue 112.

Figure 3:
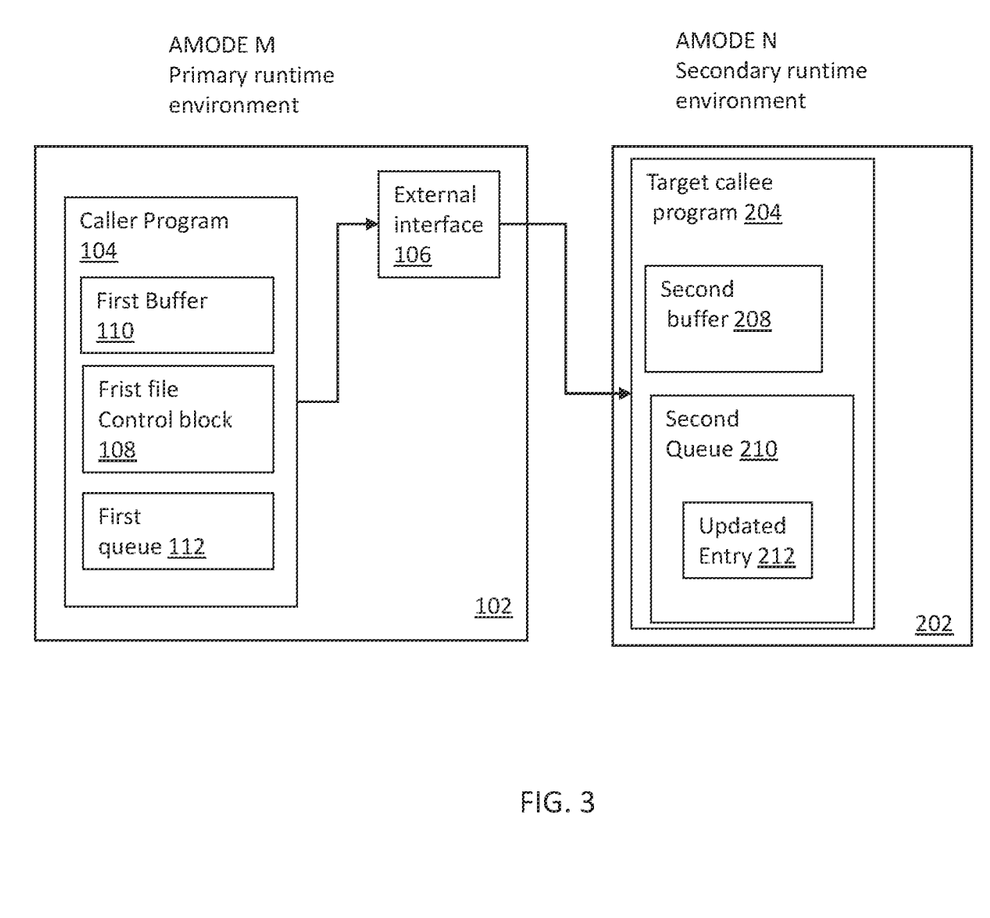
FIG. 3 illustrates a system for cooperative input/output of addressing modes for interoperative programs according to one or more embodiments of the present invention.

Referring to FIG. 3, the target callee program 204 executes its instructions and updates the file parameters transmitted by the caller program 104. The runtime library writes an updated entry 212 for the updated second file control block 206 in the updated queue of the second queue 210. It should be appreciated that although not expressly illustrated, the second file control block 206 is present in the secondary runtime environment 202. Furthermore, the runtime library updates the first file control block 108 based on the updated entry 212 in the updated queue of the second queue 210. The first file control block 108 is updated to reflect that the second file control block 206 includes a pointer to the first file control block 108 and that the target callee program 204 has completed its execution. The runtime library then deletes the updated entry 212 from the updated queue of the second queue 210.

Figure 4:
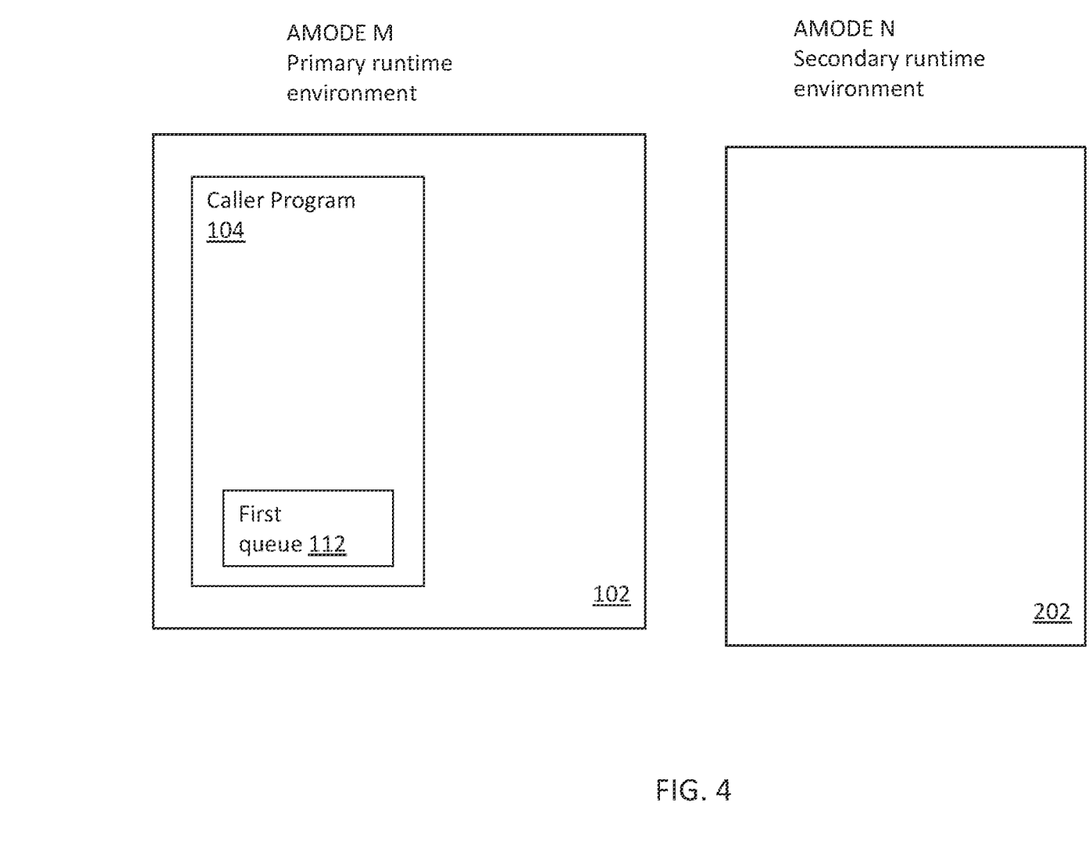
FIG. 4 illustrates a system for cooperative input/output of addressing modes for interoperative programs according to one or more embodiments of the present invention.

Referring to FIG. 4, the runtime library closes the file, and deletes the first file control block 108 from the first buffer 110. Upon deleting the updated entry 212, the runtime library adds an entry recording the deletion to a deleted file queue of the first queue 112.

If, alternatively, the number of bits of addressing mode of the secondary runtime environment 202 (AMODE N) is less than the number of bits of the addressing mode of the primary runtime environment 102 (AMODE M), the runtime library locks the first file control block 108 from being deleted and writes the address of the second file control block 206 in the address field for the pointer of the first file control block 108. In response to writing the address of the second block, the runtime library releases the first file control block 108, and therefore the first file control block 108 can be deleted.

Figure 5:
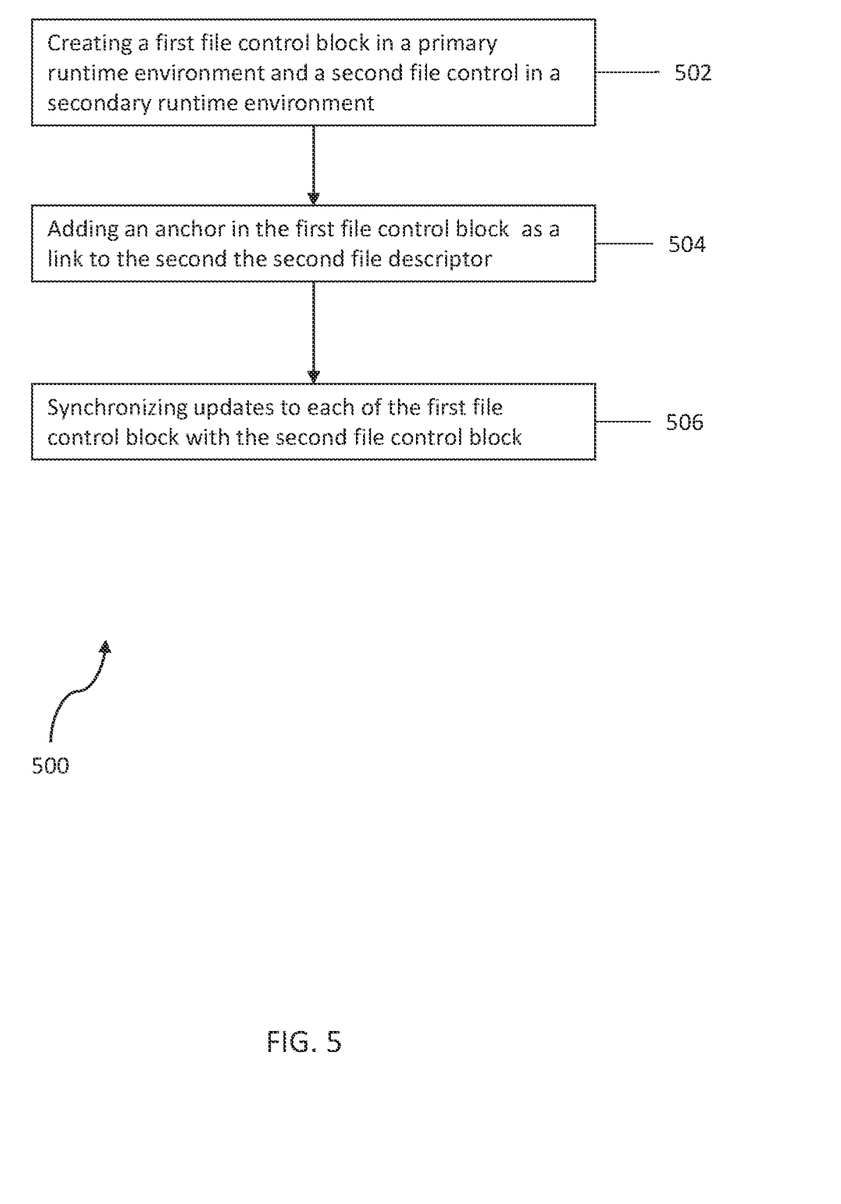
FIG. 5 illustrates a flow diagram for cooperative input/output of addressing modes for interoperative programs according to one or more embodiments of the present invention.

Referring to FIG. 5, a flow diagram 500 for cooperative input/output of addressing modes for interoperative programs according to one or more embodiments of the present invention. It should be appreciated that all or a portion of the functionality described by the flow diagram 500 can be performed on a computer system, for example, the computer system 600 described in FIG. 6. At block 502, a runtime library creates a first file control block 108 in a primary runtime environment 102 with a first addressing mode. The first file control block 108 describes a file of an application operating in the primary runtime environment 102. For example, a caller program 104 operating in a primary runtime environment 102 (AMODE M environment) calls a target callee program 204 operating in a secondary runtime environment 202 (AMODE N environment). The caller program 104 invokes an external interface 106 to call the target callee program 204. The runtime library further generates the first file control block 108 of a desired file of the caller program 104 and stores a content load of the file in a first buffer 110 and an entry in a first queue 112 of the caller program 104. In response to receiving a response from the target callee program 204, the runtime library creates a second file control block 206 in the secondary runtime environment 202 and stores a content load of a copy of the file in a second buffer 208 of the target callee program 204.

At block 504, the runtime library adds an anchor to link the first file control block 108 to the second file control block 206. For example, the runtime library determines whether the primary runtime environment 102 using the same addressing mode as the secondary runtime environment 202 (e.g., determine whether AMODE M is equal to AMODE N). If the primary runtime environment 102 does not use the same addressing mode as the secondary runtime environment 202, the runtime library further add a pointer from the second file control block 206 in the secondary runtime environment 202 to the first file control block 108 in the primary runtime environment 102.

At block 506, the runtime library synchronizes updates of each of the first file control block 108 and the second file control block 206 to reflect modification to either file control block and a deletion of either file control block. The updates are based on changes to a state of the file in the primary runtime environment 102 and the copy of the file in the secondary runtime environment 202. As such, each of the primary runtime environment 102 and the secondary runtime environment 202 include a current state of the file, via the anchored file control blocks, regardless of whether the primary runtime environment 102 operates using a different addressing mode (AMODE M) than the addressing mode (AMODE N) of the secondary runtime environment 202.

Figure 6:
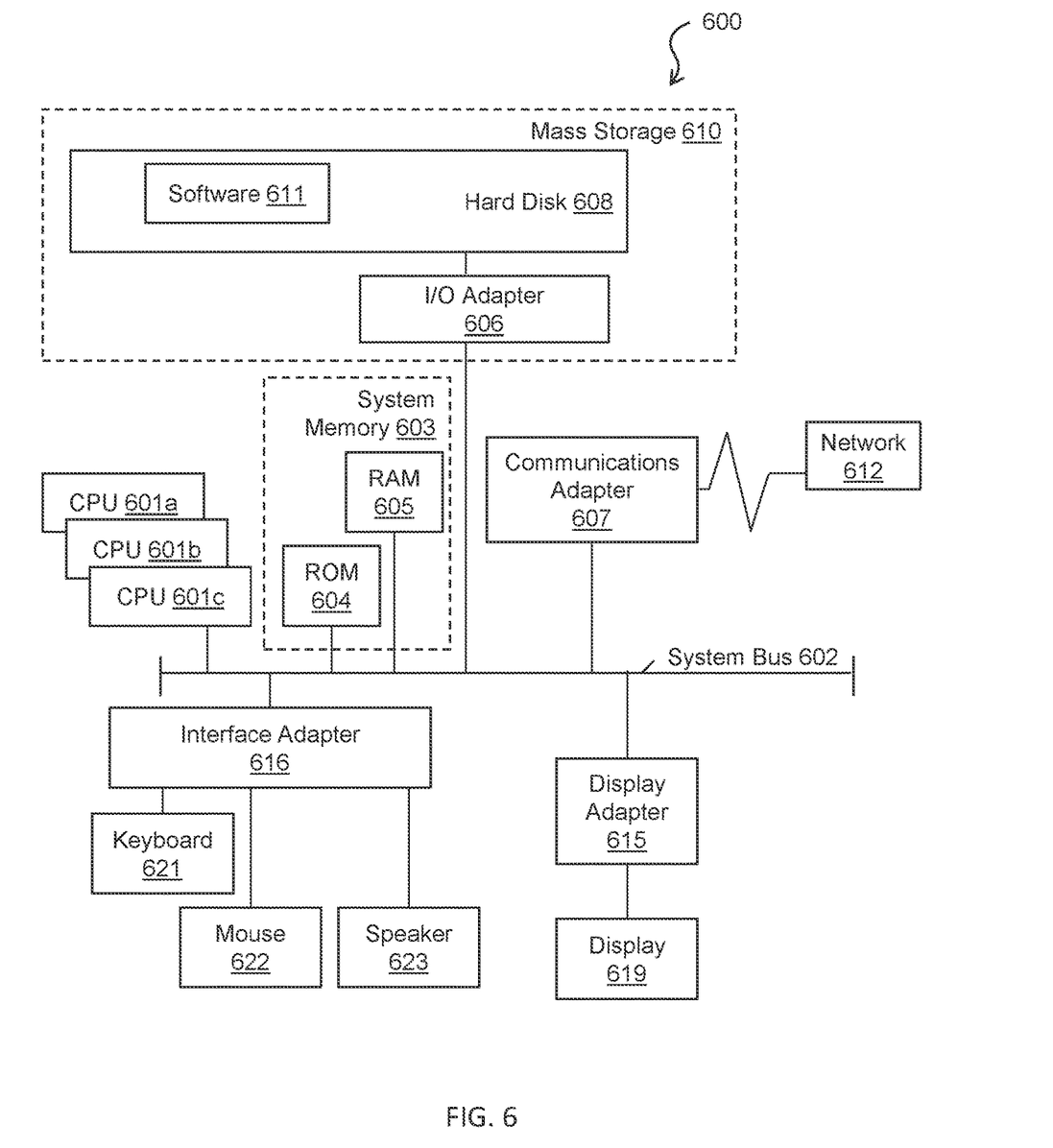
FIG. 6 illustrates a block diagram of a computer system for use in implementing one or more embodiments of the present invention.

In one or more embodiments of the present invention, the hardware/software modules in the system 100 from FIG. 1 can be implemented on the computer system 600 found in FIG. 6. Turning now to FIG. 6, a computer system 600 is generally shown in accordance with an embodiment. The computer system 600 can be an electronic, computer framework comprising and/or employing any number and combination of computing devices and networks utilizing various communication technologies, as described herein. The computer system 600 can be easily scalable, extensible, and modular, with the ability to change to different services or reconfigure some features independently of others. The computer system 600 may be, for example, a server, desktop computer, laptop computer, tablet computer, or smartphone. Computer system 600 may be described in the general context of computer system executable instructions, such as program modules, being executed by a computer system. Generally, program modules may include routines, programs, objects, components, logic, data structures, and so on that perform particular tasks or implement particular abstract data types. Computer system 600 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, the computer system 600 has one or more central processing units (CPU(s)) 601a, 601b, 601c, etc. (collectively or generically referred to as processor(s) 601). The processors 601 can be a single-core processor, multi-core processor, computing cluster, or any number of other configurations. The processors 601, also referred to as processing circuits, are coupled via a system bus 602 to a system memory 603 and various other components. The system memory 603 can include a read only memory (ROM) 604 and a random access memory (RAM) 605. The ROM 604 is coupled to the system bus 602 and may include a basic input/output system (BIOS), which controls certain basic functions of the computer system 600. The RAM is read-write memory coupled to the system bus 602 for use by the processors 601. The system memory 603 provides temporary memory space for operations of said instructions during operation. The system memory 603 can include random access memory (RAM), read only memory, flash memory, or any other suitable memory systems.

The computer system 600 comprises an input/output (I/O) adapter 606 and a communications adapter 607 coupled to the system bus 602. The I/O adapter 606 may be a small computer system interface (SCSI) adapter that communicates with a hard disk 608 and/or any other similar component. The I/O adapter 606 and the hard disk 608 are collectively referred to herein as a mass storage 610.

Software 611 for execution on the computer system 600 may be stored in the mass storage 610. The mass storage 610 is an example of a tangible storage medium readable by the processors 601, where the software 611 is stored as instructions for execution by the processors 601 to cause the computer system 600 to operate, such as is described herein below with respect to the various Figures. Examples of computer program product and the execution of such instruction is discussed herein in more detail. The communications adapter 607 interconnects the system bus 602 with a network 612, which may be an outside network, enabling the computer system 600 to communicate with other such systems. In one embodiment, a portion of the system memory 603 and the mass storage 610 collectively store an operating system, which may be any appropriate operating system, such as the z/OS or AIX operating system from IBM Corporation, to coordinate the functions of the various components shown in FIG. 6.

Additional input/output devices are shown as connected to the system bus 602 via a display adapter 615 and an interface adapter 616 and. In one embodiment, the adapters 606, 607, 615, and 616 may be connected to one or more I/O buses that are connected to the system bus 602 via an intermediate bus bridge (not shown). A display 619 (e.g., a screen or a display monitor) is connected to the system bus 602 by a display adapter 615, which may include a graphics controller to improve the performance of graphics intensive applications and a video controller. A keyboard 621, a mouse 622, a speaker 623, etc. can be interconnected to the system bus 602 via the interface adapter 616, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 6, the computer system 600 includes processing capability in the form of the processors 601, and, storage capability including the system memory 603 and the mass storage 610, input means such as the keyboard 621 and the mouse 622, and output capability including the speaker 623 and the display 619.

In some embodiments, the communications adapter 607 can transmit data using any suitable interface or protocol, such as the internet small computer system interface, among others. The network 612 may be a cellular network, a radio network, a wide area network (WAN), a local area network (LAN), or the Internet, among others. An external computing device may connect to the computer system 600 through the network 612. In some examples, an external computing device may be an external webserver or a cloud computing node.

It is to be understood that the block diagram of FIG. 6 is not intended to indicate that the computer system 600 is to include all of the components shown in FIG. 6. Rather, the computer system 600 can include any appropriate fewer or additional components not illustrated in FIG. 6 (e.g., additional memory components, embedded controllers, modules, additional network interfaces, etc.). Further, the embodiments described herein with respect to computer system 600 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    creating, by a processor, a first file control block in a primary runtime environment with a first addressing mode and a second file control block in a secondary runtime environment with a second addressing mode, wherein both the first file control block and the second file control block describe a status of a first file of a caller program in the primary runtime environment;
    passing, by the processor, parameters of the first file of the caller program in the primary runtime environment to a target callee program in the secondary runtime environment;
    adding, by the processor, an anchor in the first file control block as a link to the second the second file control block;
    synchronizing, by the processor, the first file control block and the second file control block with updates to the first file in the primary runtime environment and the passed parameters of the first file of the first file in the secondary runtime environment;
    determining that the first addressing mode is greater than the second addressing mode;
    creating the second file block in the secondary runtime environment;
    locking the first file control block in the primary runtime environment;
    anchoring the first file control block to the second file control block; and
    releasing, in response to anchoring the first file control block to the second file control block, the first file control block.

2. The computer-implemented method of claim 1, further comprising:
    opening the first file of the caller program;
    adding a content load of the first file to a buffer of the caller program; and
    adding an entry describing the first file control block to a first queue of the caller program.

3. The computer-implemented method of claim 1, further comprising:
    determining whether the first addressing mode is different than the second addressing mode; and
    in response to determining that the first addressing mode is different than the second addressing mode, creating the second file control block in the secondary runtime environment.

4. The computer-implemented method of claim 1, further comprising:
    determining whether the addressing mode is greater or lesser than the second addressing mode by:
        calling by an external interface in the primary runtime environment to the target callee program in the secondary runtime environment;
        receiving, by the external interface, a response in the primary runtime environment from the target callee program; and
        determining whether the first addressing mode is greater or lesser than the second addressing mode based on the response.

5. The computer-implemented method of claim 4, wherein the method further comprises:
    determining that the first addressing mode is less than the second addressing mode;
    creating the second file control block in the secondary runtime environment; and
    anchoring the second file control block to the first file control block.

6. The computer-implemented file method of claim 1, wherein the anchor is a pointer.

7. A system comprising:
    a memory having computer readable instructions; and
    one or more processors for executing the computer readable instructions, the computer readable instructions controlling the one or more processors to perform operations comprising:

creating a first file control block in a primary runtime environment with a first addressing mode and a second file control block in a secondary runtime environment with a second addressing mode, wherein both the first file control block and the second file control block describe a status of a first file of a caller program in the primary runtime environment;

passing parameters of the first file of the caller program in the primary runtime environment to a target callee program in the secondary runtime environment;

adding an anchor in the first file control block as a link to the second the second file control block;

synchronizing the first file control block and the second file control block with updates to the first file in the primary runtime environment and the passed parameters of the first file of the first file in the secondary runtime environment;

determining that the first addressing mode is greater than the second addressing mode;

creating the second file block in the secondary runtime environment;

locking the first file control block in the primary runtime environment;

anchoring the first file control block to the second file control block; and releasing, in respond to anchoring the first file control block to the second file control block, the first file control block.

8. The system of claim 7, wherein the operations further comprise:
opening the first file of the caller program;
adding a content load of the first file to a buffer of the caller program; and
adding an entry describing the first file control block to a first queue of the caller program.

9. The system of claim 7, wherein the operations further comprise:
determining whether the first addressing mode is different than the second addressing mode; and
in response to determining that the first addressing mode is different than the second addressing mode, creating the second file control block in the secondary runtime environment.

10. The system of claim 7, wherein the operations further comprise:
determining whether the addressing mode is greater or lesser than the second addressing mode by:
calling by an external interface in the primary runtime environment to the target callee program in the secondary runtime environment;
receiving, by the external interface, a response in the primary runtime environment from the target callee program; and
determining whether the first addressing mode is greater or lesser than the second addressing mode based on the response.

11. The system of claim 10, wherein the operations further comprise:
determining that the first addressing mode is less than the second addressing mode;
creating the second file control block in the secondary runtime environment; and
anchoring the second file control block to the first file control block.

12. The system of claim 7, wherein the anchor is a pointer.

13. A computer program product comprising a computer readable storage medium having program instructions embodied therewith, the program instructions executable by a processor to cause the processor to perform operations comprising:
creating a first file control block in a primary runtime environment with a first addressing mode and a second file control block in a secondary runtime environment with a second addressing mode, wherein both the first file control block and the second file control block describe a status of a first file of a caller program in the primary runtime environment;
passing parameters of the first file of the caller program in the primary runtime environment to a target callee program in the secondary runtime environment;
adding an anchor in the first file control block as a link to the second the second file control block;
synchronizing the first file control block and the second file control block with updates to the first file in the primary runtime environment and the passed parameters of the first file of the first file in the secondary runtime environment;
determining that the first addressing mode is greater than the second addressing mode;
creating the second file block in the secondary runtime environment;
locking the first file control block in the primary runtime environment;
anchoring the first file control block to the second file control block; and
releasing, in respond to anchoring the first file control block to the second file control block, the first file control block.

14. The computer program product of claim 13, wherein the operations further comprise:
opening the first file of the caller program;
adding a content load of the first file to a buffer of the caller program; and
adding an entry describing the first file control block to a first queue of the caller program.

15. The computer program product of claim 13, wherein the operations further comprise:
determining whether the first addressing mode is different than the second addressing mode; and
in response to determining that the first addressing mode is different than the second addressing mode, creating the second file control block in the secondary runtime environment.

16. The computer program product of claim 13, wherein the operations further comprise:
determining whether the addressing mode is greater or lesser than the second addressing mode by:
calling by an external interface in the primary runtime environment to the target callee program in the secondary runtime environment;
receiving, by the external interface, a response in the primary runtime environment from the target callee program; and
determining whether the first addressing mode is greater or lesser than the second addressing mode based on the response.

17. The computer program product of claim 16, wherein the operations further comprise:
determining that the first addressing mode is less than the second addressing mode;
creating the second file control block in the secondary runtime environment; and anchoring the second file control block to the first file control block.

* * * * *